United States Patent [19]

Pinnow et al.

[11] Patent Number: 4,491,983
[45] Date of Patent: Jan. 1, 1985

[54] INFORMATION DISTRIBUTION SYSTEM

[75] Inventors: Douglas A. Pinnow, Cheshire; Gary E. Miller, Wallingford, both of Conn.

[73] Assignee: Times Fiber Communications, Inc., Wallingford, Conn.

[21] Appl. No.: 373,110

[22] Filed: Apr. 29, 1982

Related U.S. Application Data

[63] Continuation-in-part of Ser. No. 263,552, May 14, 1981, abandoned.

[51] Int. Cl.³ ............................. H04B 9/00; H04N 7/12
[52] U.S. Cl. ........................................ 455/612; 358/86; 370/4; 455/602; 455/603; 455/607; 455/608; 455/613
[58] Field of Search ................ 358/86; 455/602, 607, 455/610, 612, 603, 608; 370/4

[56] References Cited

U.S. PATENT DOCUMENTS

| | | |
|---|---|---|
| 3,244,809 | 4/1966 | Fuller et al. . |
| 3,633,034 | 1/1972 | Uchida et al. . |
| 3,633,035 | 1/1972 | Uchida et al. . |
| 3,643,164 | 2/1972 | Sly et al. . |
| 3,693,090 | 9/1972 | Gabriel . |
| 3,706,040 | 12/1972 | Gargini . |
| 3,751,670 | 8/1973 | Grodner ................. 358/86 |
| 3,786,424 | 1/1974 | McVoy et al. . |
| 3,794,922 | 2/1974 | Osborn et al. . |
| 3,803,491 | 4/1974 | Osborn . |
| 3,846,703 | 11/1974 | Stewart et al. . |
| 3,857,997 | 12/1974 | Toonder . |
| 3,931,512 | 1/1976 | Kent ................... 455/612 |
| 3,987,397 | 10/1976 | Belcher et al. . |
| 3,990,012 | 11/1976 | Karnes . |
| 3,993,955 | 11/1976 | Belcher et al. . |
| 4,027,153 | 5/1977 | Kach . |
| 4,035,838 | 7/1977 | Bassani et al. . |
| 4,062,043 | 12/1977 | Zeidler et al. ............... 358/86 |
| 4,064,460 | 12/1977 | Gargini . |
| 4,089,584 | 5/1978 | Polczynski ............... 350/96.16 |
| 4,090,067 | 5/1978 | Bell et al. . |
| 4,135,157 | 1/1979 | den Toonder . |
| 4,135,202 | 1/1979 | Cutler ..................... 358/86 |
| 4,149,186 | 4/1979 | Chung ..................... 358/86 |
| 4,161,650 | 7/1979 | Caouette et al. . |
| 4,183,054 | 1/1980 | Patisaul ................... 455/612 |
| 4,210,803 | 7/1980 | Ih ......................... 455/610 |
| 4,232,385 | 11/1980 | Hara ...................... 455/610 |
| 4,290,142 | 9/1981 | Schnee et al. . |
| 4,302,771 | 11/1981 | Gargini . |
| 4,308,554 | 12/1981 | Percy et al. . |
| 4,310,754 | 1/1982 | Check .................... 455/602 |
| 4,322,854 | 3/1982 | Bundens et al. . |
| 4,343,042 | 8/1982 | Schrock et al. . |
| 4,360,828 | 11/1982 | Briggs, Jr. et al. . |

OTHER PUBLICATIONS

NTH-Fachber, (Germany), vol. 73, (1980), pp. 119-124, "A Multiservice System Using Fiber Optic Loops", D. J. Gray et al.
Keith Y. Chang, Abstract entitled "Integrated Delivery of Telecommunication Services with Fiber Optics".

*Primary Examiner*—Howard W. Britton
*Attorney, Agent, or Firm*—Bacon & Thomas

[57] ABSTRACT

An information distribution system is disclosed. The system is composed of hub distribution centers which are connected to a plurality of individual subscribers by fiber optic cable or bidirectional coaxial cable. The system is particularly suitable for CATV distribution but may also be adapted to provide telephone, mail, radio and other services to the subscribers through the same cable connection with the hub distribution center.

14 Claims, 11 Drawing Figures

INFORMATION DISTRIBUTION SYSTEM

CROSS REFERENCE TO RELATED APPLICATION

This application is a continuation-in-part of U.S. patent application Ser. No. 263,552, filed May 14, 1981, now abandoned.

BACKGROUND OF THE INVENTION

1. Field of the Invention

The subject invention is directed to an information distribution system, particularly adapted for cable television (CATV) broadcasting.

2. Description of the Prior Art

During the past three decades, television has become standard in most American homes. For the most part, television systems have operated utilizing VHF and UHF signals transmitted by powerful broadcasting stations through the atmosphere and received by antennas connected to individual television sets. However, in recent years cable television system have become increasingly popular. In the typical cable TV system, the television signal is transmitted to individual subscribers through coaxial cable. Each subscriber's unit is tapped into a trunk line which carries the signal for the entire distribution network.

However, conventional coaxial cable systems are somewhat constrained by the number of channels which they can distribute. In order to penetrate urban areas with cable TV systems, operators have been required to provide many more channels than are offered in rural areas. To achieve this capacity, virtually all existing CATV systems employ a frequency division multiplexing transmission scheme. All available video channels are frequency division multiplexed and simultaneously transmitted on a coaxial cable to the subscriber. The subscriber unit is equipped with a converter which receives the multiplexed video channels, selects the desired channel and converts it to the appropriate viewing frequency, typically corresponding to channels 2, 3 or 4 on the subscriber's television set. Thus, the converter performs essentially two functions, namely channel selection and electronic frequency conversion. Each of these functions requires different component parts in the subscriber unit. The components required for the electronic frequency conversion function are relatively expensive and susceptible to tampering by subscribers. The problem of subscriber tampering is particularly acute in systems which offer different tiers of service at different prices. In such systems, subscribers may attempt to gain access to channels they have not paid for by tampering with the frequency converter in their unit.

While systems have been proposed to separate the frequency conversion function from the channel select function to eliminate susceptibility to theft of unauthorized signals, as in U.S. Pat. No. 4,064,460, they have not proved commercially attractive due to the fact that they require relatively complex and expensive electronic switching stations.

In view of the shortcomings of the conventional wired broadcasting system, particularly in urban areas, a "ramified" distribution network is proposed by Grodner et al in U.S. Pat. No. 3,751,670. In this system, the television signal is transmitted directly to an individual subscriber from a distribution center using optical signals as the transmission medium. The optical signals are transmitted in free space from the distribution center to a receiver at the subscriber station. Mirrors are used when it is necessary to change the direction of the signal to avoid obstacles. Each subscriber station is also equipped with means for generating and transmitting an optical signal to the distribution station to request service.

Since each individual subscriber receives a single signal directed from the distribution station, there is no need to employ frequency division multiplexing in providing multi-channel service to the subscriber. This permits more precision in measuring the use of the system by each subscriber for accounting purposes.

However, the ramified distribution network exhibits different, but equally serious, shortcomings. For example, because each subscriber station must be within signalling range of a distribution station, many distribution stations are required to service an area which would normally be served by a single broadcasting station. This is especially true in an urban area where buildings limit the number of straight, unobstructed paths which are required for transmitting optical signals between the distribution and subscriber stations. The only way in which the optical signals can be made to change direction is by interposing a series of mirrors, which presents other obvious disadvantages. Additionally, weather conditions can adversely affect the quality of the optical signals transmitted through free space, thereby causing poor reception at the subscriber station.

Fiber optics have been used in a limited number of cable TV trunk lines and, in at least one case, for distribution to homes in Japan. The Japanese system, known as Hi-OVIS, connects approximately 160 homes with a two-way switched video system. A highly complex and expensive video switch is required to direct 32 channels to 168 different outputs. Transmission is done at baseband on plastic clad silica fibers using LED sources. The system requires two optical fibers for each subscriber unit to provide two-way video service.

While the Hi-OVIS system avoids the problems associated with open air optical signalling, because of the complexity and expense of the video switch and the use of two-way video service, the system is far from economically viable.

Another system employing fiber optics is disclosed in U.S. Pat. No. 4,135,202. In this system, a common optical fiber connects a plurality of subscribers with a central broadcasting station. Hence, the system is similar to the trunk line system which conventionally employs coaxial cable. In an alternative embodiment, the patent discloses connecting a plurality of subscribers to the central broadcasting station with a plurality of individual optical fibers. Each subscriber is further connected to the central station by one or more individual auxiliary transmission lines.

Recently, a third TV distribution system utilizing optical fiber was suggested by K.Y. Chang (CLEOS meeting, San Diego, Calif. 2/27/80). This system contemplates using a single optical fiber for bidirectional signalling between a central switching node and the subscriber unit. At the central switching node, signals from a variety of sources are frequency division multiplexed and delivered to the subscriber through a single optical fiber. Here again, the switching mechanism at the central switching node and subscriber unit is quite complex since the various input signals must be multiplexed at the central switching node before transmitting them to the subscriber where they must be demultiplexed for channel selection.

While it is evident from the foregoing that numerous systems have been proposed for distributing information to a plurality of individual subscribers, there is, as yet, no system which is particularly suited for cable TV distribution in an urban setting where tiered service and security from tampering and signal theft are imperative.

SUMMARY OF THE INVENTION

It is a primary object of the invention to provide an improved information distribution system, which is particularly adapted for CATV broadcasting in urban environments.

Another object of the invention is to provide an information distribution system which makes available to the subscriber a wide variety of services in addition to video programs.

Still other objects and advantages of the invention will be apparent to those of skill in the art upon review of the detailed description contained herein.

These objects and advantages are achieved according to the invention by an information distribution system comprised of at least one hub distribution center (more simply referred to as the hub) connected to a plurality of individual transmission lines. The hub distribution center is equipped with means for selecting a single information signal from a plurality of signals having different characteristic frequencies in response to a signal received from a subscriber unit, for converting the single signal to the transmission frequency and for transmitting the signal to an individual subscriber unit. The hub distribution center also contains means for receiving signals generated and transmitted from each subscriber unit over its individual connection to the hub, to select an information signal available at the hub.

Each subscriber unit contains means for generating a signal which identifies one of the information channels available at the hub and means for transmitting this signal to the hub. The transmission lines which connect the hub and the subscribers are comprised of fiber optic cables or bidirectional coaxial cables.

The hub system of the invention is particularly suited for cable TV distribution in which case the information signals would be video channels fed to the hub.

BRIEF DESCRIPTION OF THE FIGURES OF DRAWING

DETAILED DESCRIPTION OF THE PREFERRED EMBODIMENTS

Figure 1:
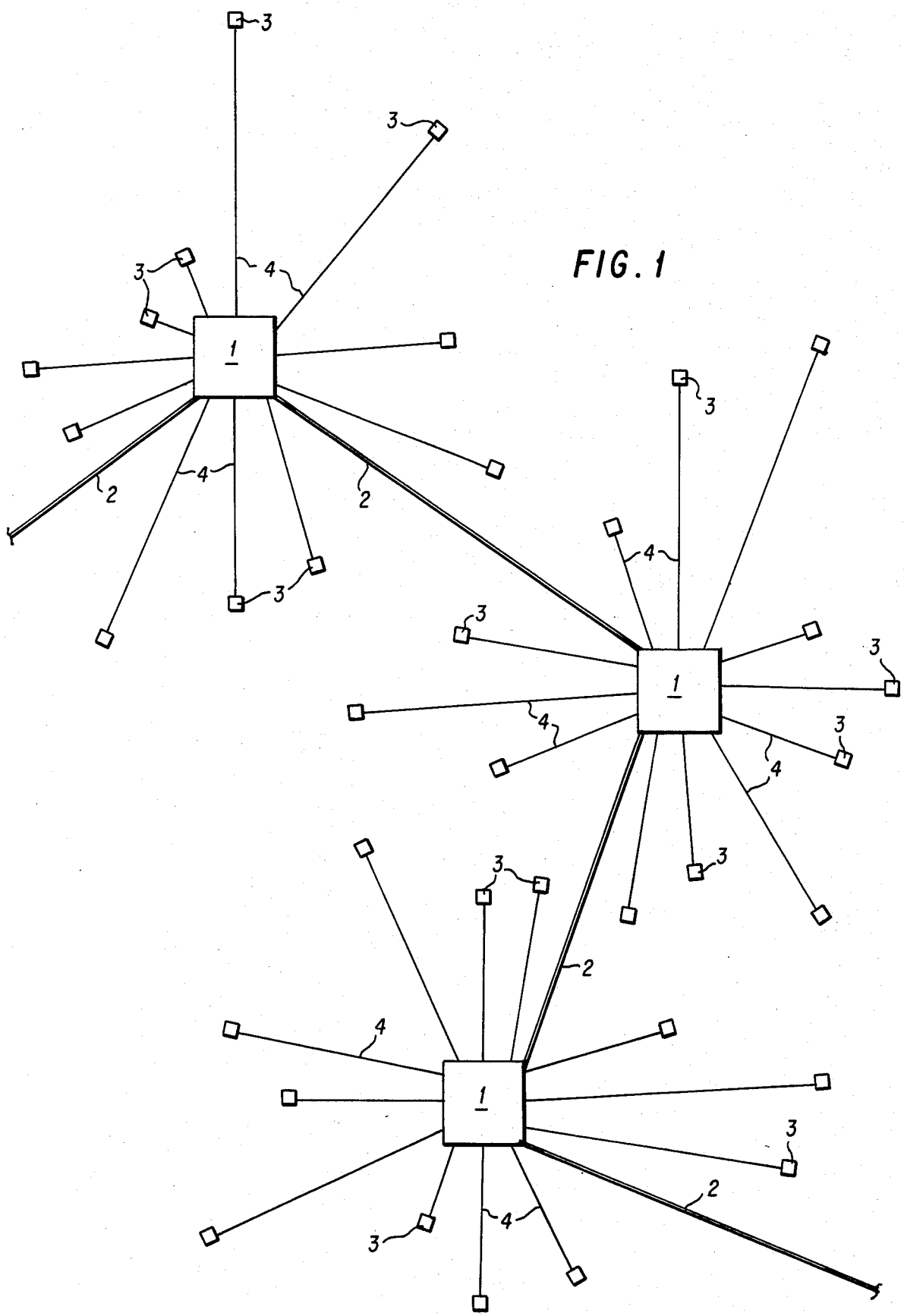
FIG. 1 illustrates an information distribution system designed in accordance with the invention.

The Figures of Drawing illustrate various embodiments of a distribution system designed in accordance with the invention. As shown in FIG. 1, the system is composed of hub distribution centers 1 which are connected by trunk lines 2. Each hub distribution center is also connected to a plurality of subscriber units 3 by transmission lines 4. The trunk lines may be constructed from conventional coaxial cable or from fiber optic cable. It is also possible for the hub distribution centers to receive the trunk signals via satellite, in which case the trunk lines would be eliminated in favor of satellite receivers. The trunk lines, in turn, feed into central distribution stations which provide the signal for a plurality of hub distribution centers. The transmission lines which connect a subscriber unit to a hub are fiber optic cable or bidirectional coaxial cable as described in detail hereinafter.

The hub center may be located several miles from the subscribers, generally in rural areas, or very close to the subscribers, e.g., in the same building, in high-rise dwellings in urban areas. Urban settings are particularly suited for the system of the invention since each high-rise dwelling can be serviced by a single hub center.

Figure 2:
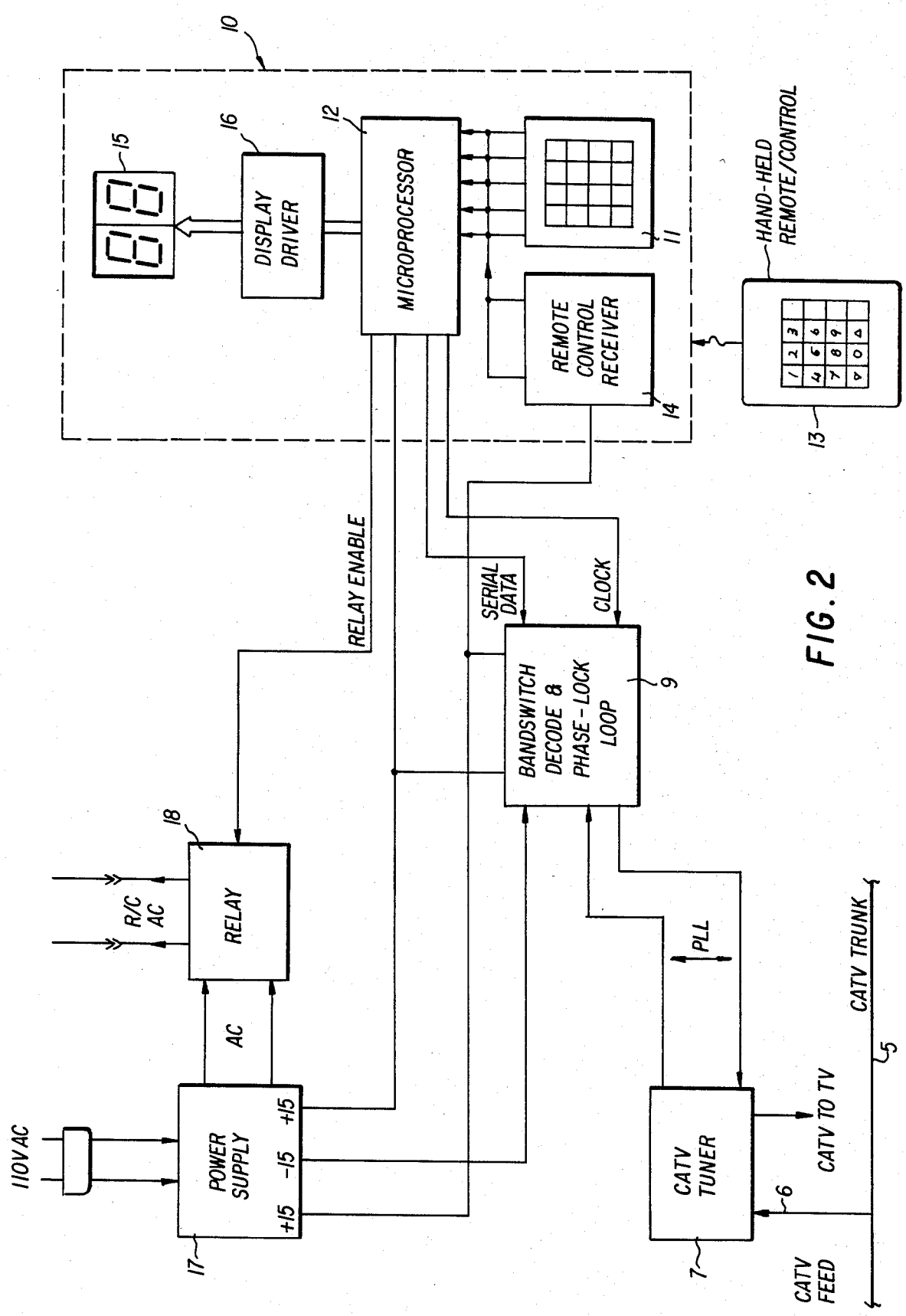
FIG. 2 is a functional diagram showing a subscriber unit in a conventional cable TV distribution system.
Figure 3:
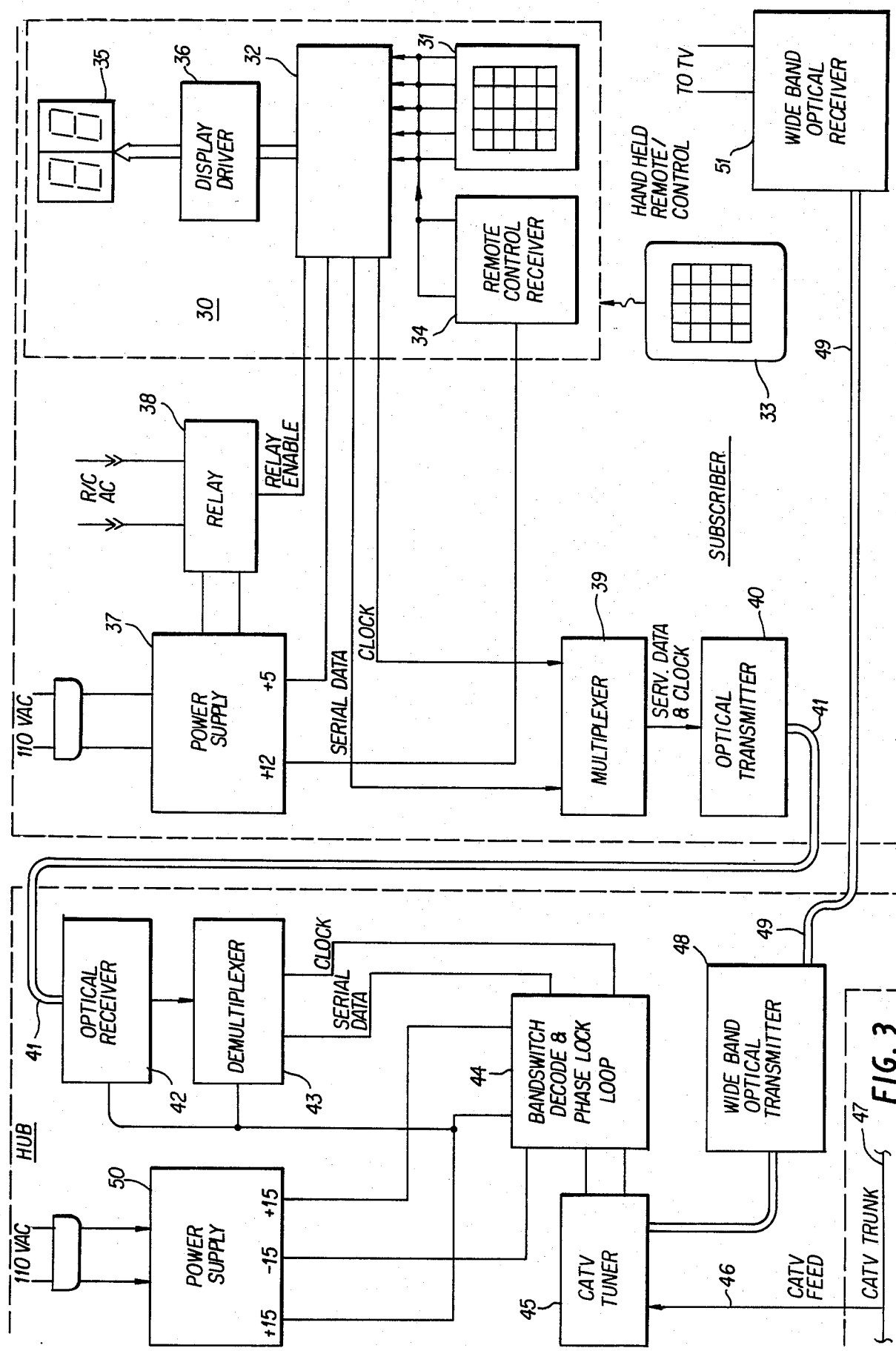
FIG. 3 is a functional diagram showing the connection of a subscriber unit to a hub distribution center in accordance with the invention.

The design of a commercial, state-of-the-art subscriber unit employed in existing cable TV systems and the combination of a subscriber unit with a hub distribution center in accordance with the invention are depicted in FIGS. 2 and 3, respectively, for purposes of comparison. In FIG. 2, the subscriber unit of a conventional system is seen to be provided with a CATV feed 6, directly from trunk line 5. The feed consists of all available video channels in a frequency division multiplexed mode. The multiplexed video channels are directed into tuner 7 which selects an individual channel in response to a channel select signal, converts it to the appropriate viewing frequency (generally corresponding to Channels 2, 3, or 4) and transmits it to the subscriber's TV set. The tuner is stabilized by a phase-lock loop contained in decoder 9 that receives a reference signal from a crystal controlled oscillator. This renders the tuner insensitive to drifting, thereby eliminating the need for periodic tuner adjustments.

The channel select signal is generated by a microprocessor controlled channel select unit 10. To operate this unit, the subscriber pushes a button corresponding to the desired function (e.g., on-off, video channel, or other service) on keyboard 11 and activates the microprocessor 12 which is programmed to send the appropriate information to the decoder 9. As pictured in FIG. 2, the keyboard is often placed in a handheld, remote control unit 13, for added convenience. When a button on this unit is pushed to select a desired function, typically the desired video channel, a characteristic signal is transmitted and received by remote control receiver 14 where it is converted to an electrical signal and fed to the micro-processor. The channel select unit also contains a digital display 15, driven by display drive 16, which displays the number of the channel selected by the subscriber.

Decoder 9 receives and interprets the channel select information transmitted by the micro-processor in the form of serial data and clock bit streams. The serial data identifies the channel, while the clock identifies the serial data as valid. The decoder selects the requested video channel from the tuner by generating a characteristic voltage which identifies the video channel. The tuner is stabilized by the phase-lock loop which insures that the tuner remains responsive to the voltages generated by the decoder.

Power supply 17 provides the power to drive the various components of the subscriber unit. Relay 18 is provided to turn the TV on and off when the on-off button is pressed on the channel select unit.

Referring to FIG. 3, the combination of a subscriber unit with a hub distribution center in accordance with the invention is shown. In this system, the subscriber unit is comprised of channel select unit 30, which is identical to the channel select unit 10 contained in the subscriber unit of FIG. 2. The unit comprises keyboard 31, micro-processor 32, handheld remote control panel 33, remote control receiver 34, display 35 and display drive 36, all functioning in the same manner as discussed with respect to FIG. 2. Power supply 37 and relay 38 are also present for the reasons previously stated.

The subscriber unit in the system of the invention differs from the conventional unit in that the decoder and tuner which select the requested video channel and convert it to the appropriate viewing frequency are separate from the subscriber unit and housed in the hub distribution center. Accordingly, the subscriber unit must contain means for transmitting the channel select information to the hub and means for receiving the selected information channel from the hub. The former is provided by multiplexer 39 and optical transmitter 40. The multiplexer combines the serial data and clock output from the micro-processor and directs it to the optical transmitter where it is transformed into an optical signal and transmitted to the hub through optical fiber 41. Because the channel select information is multiplexed, only one optical fiber is required for transmission. Without a multiplexer, two transmission lines would be necessary to carry the channel select information to the hub. Hence, while the inclusion of the multiplexer in the subscriber unit is not absolutely necessary, it is much preferred as it simplifies transmission of the channel select information.

Alternatively, the need for a multiplexer can be avoided by employing a micro-processor which provides only data output which can be transmitted directly to the optical transmitter without multiplexing as described hereinafter with respect to the preferred embodiments of the invention.

Figure 3A:
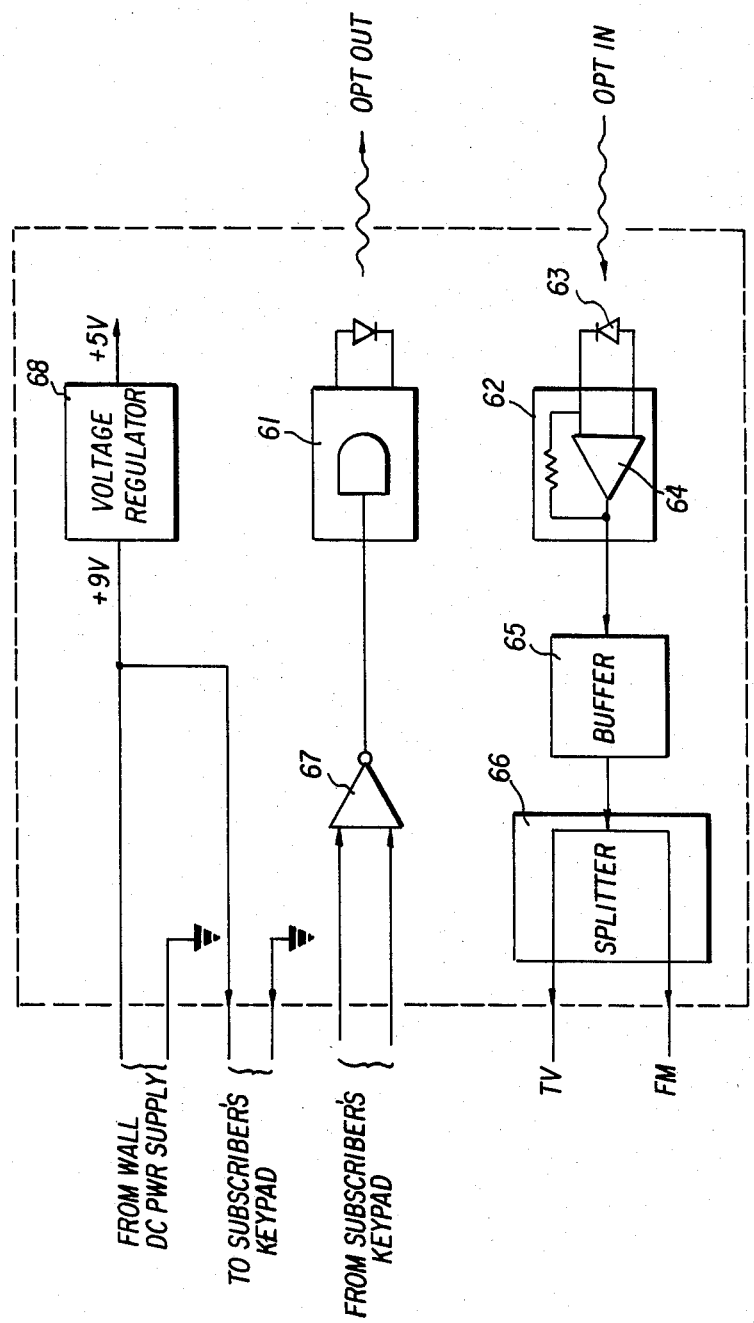
FIG. 3a is a functional diagram of a residential interface unit (RIU) in accordance with a preferred embodiment of the invention.

According to a preferred embodiment of the invention the components of the subscriber unit are housed in two separate parts. The channel select unit 30 is conveniently housed in a keypad located on the subscriber's TV set. The keypad allows for tiered access to over 100 video channels and other functions such as opinion polling, pay-per-view, parental authorization codes and other interactive services made available by the cable operator at the hub. The remaining components of the subscriber unit are housed in a permanently mounted wall unit, referred to as a residential interface unit (RIU). FIG. 3a depicts a typical RIU for use in the system of the invention. It comprises digital LED transmitter 61, and a low-noise wideband optical receiver 62. The optical receiver uses a low voltage, high speed PIN detector 63, packaged to provide optiumum coupling to a large core optical fiber without using a pigtail. A low-noise, wide band transimpedance amplifier 64 performs the necessary current-to-voltage transformation. The video channel and FM band are made available at separate connectors via a buffer stage 65 and power splitter 66. Line receiver 67 regenerates the data streams transmitted from the subscriber's keypad and directs it to the optical transmitter 61. The need for a multiplexer is avoided in this embodiment since only data and conjugate data streams are transmitted from the keypad. Voltage regulator 68 provides the necessary power to drive the keypad and RIU.

Referring again to FIG. 3, at the hub the optical signal is received by optical receiver 42 and demultiplexed by demultiplexer 43. This returns the channel select information into the same form as exited the micro-processor in the subscriber unit. The channel select information is directed to decoder 44 which, as previously described, interprets the information and selects the desired video channel from tuner 45. The tuner receives the CATV feed 46 in frequency division multiplexed form from trunk line 47, converts the requested video channel to the appropriate viewing frequency and directs it to optical transmitter 48 where it is transformed into an optical signal and transmitted to the requesting subscriber unit through optical fiber 49. The components in the hub are driven by power supply 50. Because the hub must contain an individual tuner system for each subscriber served by the hub, the hub should be constructed with a view towards expansion.

Figure 3B:
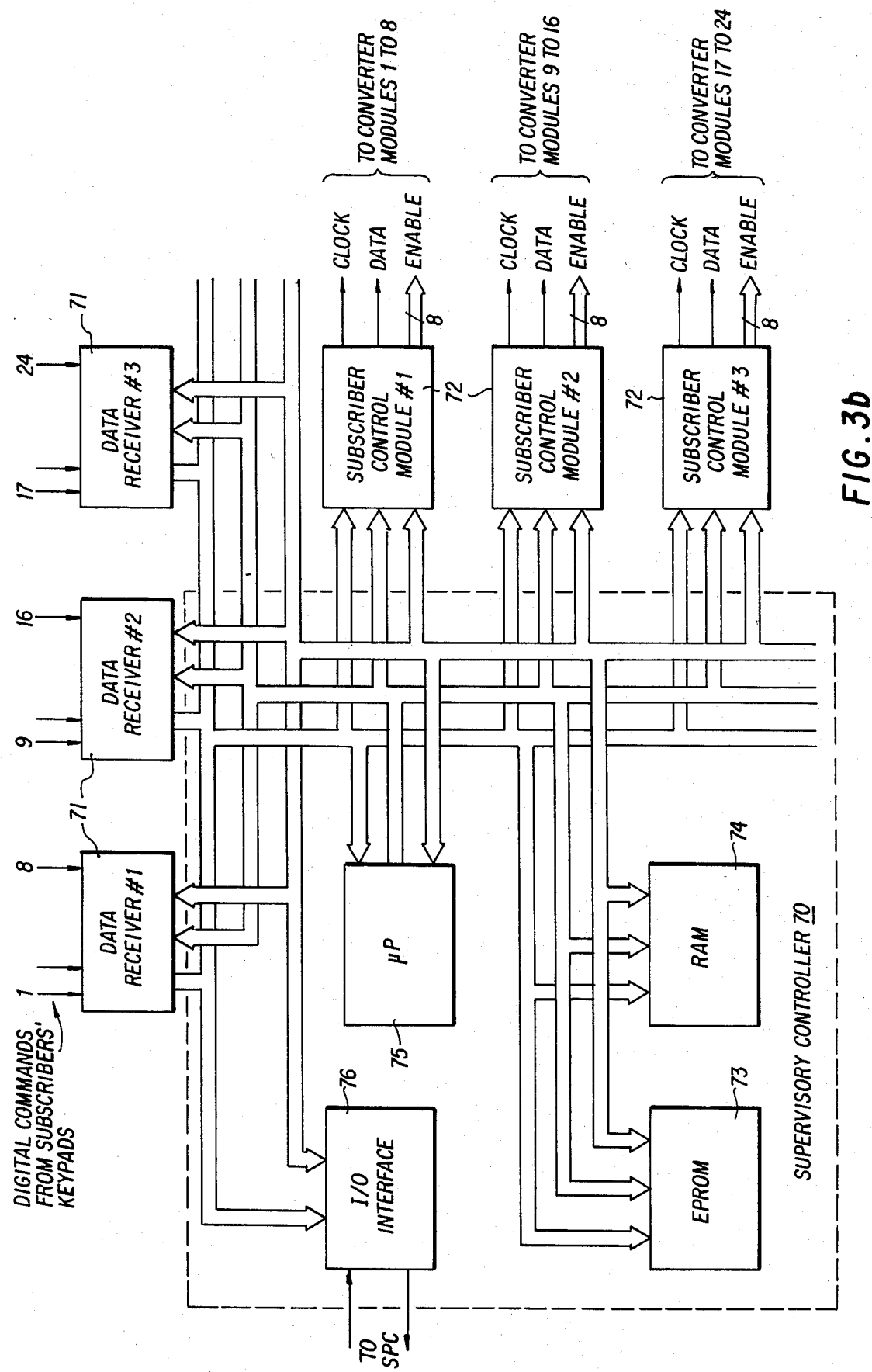
FIG. 3b is a functional diagram of a digital controller which is part of a central distribution unit (CDU) in accordance with a preferred embodiment of the invention.

In a preferred embodiment of the invention, the components of the hub are organized into central distribution units (CDU) comprised of two main sections, a digital controller and converter modules. Each CDU is capable of servicing twenty-four subscribers. The digital controller, depicted in FIG. 3b, communicates with subscribers as well as cable operators to exercise necessary control in delivering authorized levels of TV and other services to the subscriber. The major components of the digital controller are the supervisory controller 70, data receivers 71 and subscriber control modules 72.

Supervisory controller 70 provides the necessary control over data flow to implement the various services as well as supporting the many diagnostic functions designed into the system. It contains a mini-computer comprised of electrically programmable read only memory (EPROM) 73, random access memory (RAM) 74, and micro-processor 75, and an input/output interface 76 for communicating with the cable operator.

Data receivers 71 receive the digital channel select signal transmitted from the subscriber. Each data receiver supports eight subscribers, and up to three data receivers may be installed in each CDU. Hence, a total of twenty-four subscribers can be serviced by each CDU contained in the hub.

Subscriber control modules 72 are micro-processor based channel selection control units. One module services up to eight subscribers by acting upon commands which are routed to it by the supervisory controller. Commands include the channel select signal transmitted from a data receiver as well as enable/disable authorizations for tiered service. Following receipt of a channel select signal, the micro-processor in the module compares the signal to those stored in its electrically alterable read only memory to determine the subscriber's status. If the service is authorized, the module's micro-processor sends the appropriate signal in the form of data and clock bit streams to the phase locked loop circuitry to obtain the requested channel. The micro-processor also issues an enable signal to insure that the signal is transmitted to the appropriate phase locked loop circuitry.

The phase locked loop circuitry is contained in a converter module. The converter module is a programmable channel selection unit which delivers one subscriber selected and authorized channel as well as the entire FM band to the uplink optical fiber through which it is transmitted to the subscriber. One module is required per subscriber.

Figure 3C:
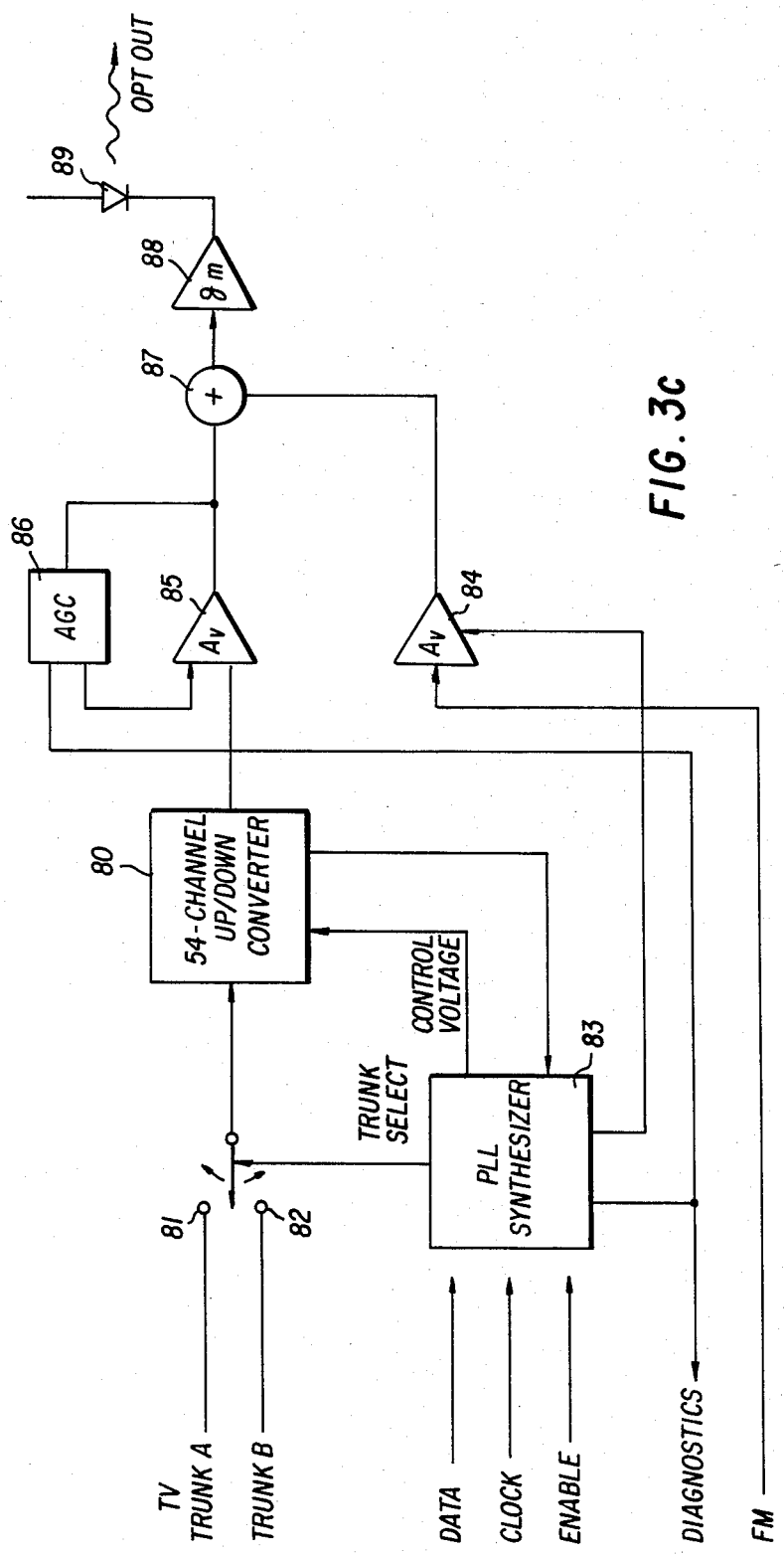
FIG. 3c is a functional diagram of a converter module which is part of a central distribution unit (CDU) in accordance with a preferred embodiment of the invention.

As shown in FIG. 3c, the converter module comprises up/down converter 80 which is switched between trunk lines 81 and 82 on command from the subscriber. Each trunk line contains a maximum of fifty-four video channels stacked in a frequency division multiplexed format. Channel select and other commands to the module are sent from the subscriber control module in serial form to phase locked loop circuitry 83. The phase locked loop circuitry generates the necessary control voltage to set up/down converter's VCO frequency in response to the channel select command on its data input line. Amplifiers 84 and 85 enhance the FM band and the video channel which is selected. Control of the LED drive by automatic gain control 86 assures specified modulation depth and performance level in spite of certain extent of channel-to-channel level variation. The video and FM signals are combined in mixer 87 and directed to transconductance amplifier 88 which performs the necessary voltage-to current transformation. A conventional wideband LED 89 is used to transmit the multiplexed TV and FM signal on frequency upstream to the subscriber.

Control of the central distribution units in the hub is provided by a computer system referred to as the subscriber program controller (SPC). The smallest version of this system is capable of supporting from 20,000 to 30,000 subscribers. The SPC permits the cable operator to provide various levels or tiers of video and other information services such as mail, telephone, data, home security, etc. by providing enable/disable authorization signals to each subscriber control module depending upon the level of service contracted for by the subscriber. The SPC also provides the accounting system for billing the subscribers on the basis of subscriber use of the system. This allows for one time, per viewing charges as well as regular service charges for use of the system.

Referring again to FIG. 3, the optical signal transmitted from the hub is received by optical receiver 51 at the subscriber unit, which converts it to an electronic signal of the appropriate viewing frequency and directs it to the subscriber's TV set or radio.

Since all optical fibers have a well known bandwidth limitation due to a characteristic bandwidthlength product, it is desirable to transmit the video information from the hub to the subscriber using as low a carrier frequency as possible, if only the transmission characteristics of the optical fiber are considered. This would suggest baseband transmission (i.e., a frequency band of 0 to 4 MHz). However, because of well known inverse frequency noise and other factors, it is not always practical to work near zero Hz. An alternative is to transmit with a small frequency off-set from zero, such as 1 MHz, so that the video signal would cover the 1 to 5 MHz band. This off-set method is known as the vestigial side band (VSB) technique.

However, in cable TV distribution systems other factors besides the transmission properties of the optical fiber must be considered. Thus, while baseband and VSB transmissions maximize the transmission properties of the optical fiber, they require a relatively expensive component to be present at the subscriber unit to convert the transmitted carrier frequency up to one of the conventional TV channels. To avoid this complication, a carrier frequency corresponding to Channel 2 (54 to 60 MHz), Channel 3 (60 to 66 MHz), or Channel 4 (66 to 72 MHz) can be used to transmit the video signal. Although these higher frequencies tax the optical fiber and light emitters to a greater extent than baseband or VSB frequencies, they provide the advantage of eliminating the expense of a frequency converter in the subscriber unit.

Thus, in systems where the added expense is justified baseband and VSB transmission frequencies are preferable. However, for most cable TV distribution systems the additional expense is not justifiable and hence transmission frequencies at Channels 2, 3 and/or 4 are preferred. These channels are the best choices since the remaining VHF channels are all at higher frequencies and would further tax the optical fiber and light emitters.

In an exemplary transmission format, one TV channel either on Channel 3 (60 to 66 MHz) or Channel 4 (66 to 72 MHz) and FM band consisting of twenty carriers in the 88–108 MHz range, are transmitted to the subscriber over the uplink fiber. The digital channel select data from the subscriber unit is transmitted downstream at 9.6 kb/s using NRZ code.

The transmission frequency of the video signal will determine the type of optical fiber used to connect the subscriber to the hub. Generally, low frequency transmission may be accomplished using step-index fiber. In addition, transmission of video signals at the Channel 2, 3, or 4 carriers can be achieved using specially designed step index fibers with low numerical apertures. For example, with a step index fiber having a numerical aperture of 0.15±0.02, transmission distance on the order of 500 meters can be achieved. For longer distances or higher frequency information signals use of more expensive graded-index fiber may become necessary because further reductions in the numerical aperture of the step index fiber may make it too sensitive to microbending losses.

Additionally, to facilitate connections, it is preferred to use large core fiber, that is, fiber having a light transmitting core greater than 150 microns and preferably about 200 microns in diameter, which exhibits a bandwidth-length product equal to or greater than 40 MHz-km. The large core fiber is also advantageous for use with inexpensive optical connectors because tolerances on centering the fiber are substantially reduced when using the large core. Hence, the advantages of large core fiber outweigh the disadvantages in systems where transmission links are relatively short, such as in high-rise urban dwellings.

A wide variety of different types of fiber optic cable may be used in the system of the invention. For example, a cable containing two optical fibers, one for downstream transmission of the selected video signal from the hub to the subscriber, and one for upstream transmission of channel select information from the subscriber to the hub, can be employed. This is the system shown in FIG. 3.

In a further variation, the downstream and upstream signals can be transmitted over a single optical fiber. However, if light having the same wavelength is used in both streams, bidirectional couplers must be provided at each end of the transmission line. If light having different wavelengths is used on the streams, the system can be designed so that only one bidirectional coupler is required for each hub-subscriber transmission line. For short runs, the cost of an extra optical fiber will be less than the cost of the bidirectional couplers, making the two-fiber cable preferable. On the other hand, cost factors will favor the use of a single-fiber cable with bidirectional couplers in long runs. Two suitable designs for systems employing a bidirectional fiber optic cable are pictured in FIGS. 4 and 5, and discussed in detail below.

Hybrid cables employing combinations of optical fiber and metal wires may also be used in the system of the invention. For example, a fiber optic cable containing a single optical fiber and twin metal reinforcing wires running parallel to the fiber can be employed. With such a cable as the transmission medium, the downstream video signal would be transmitted through the fiber while the much lower frequency channel select information would be transmitted through the twin metal wires. For short runs, steel wires are adequate, while for longer runs wires made from metals of lower electrical resistivity, such as copper or copper clad steel, are preferred.

Figure 4:
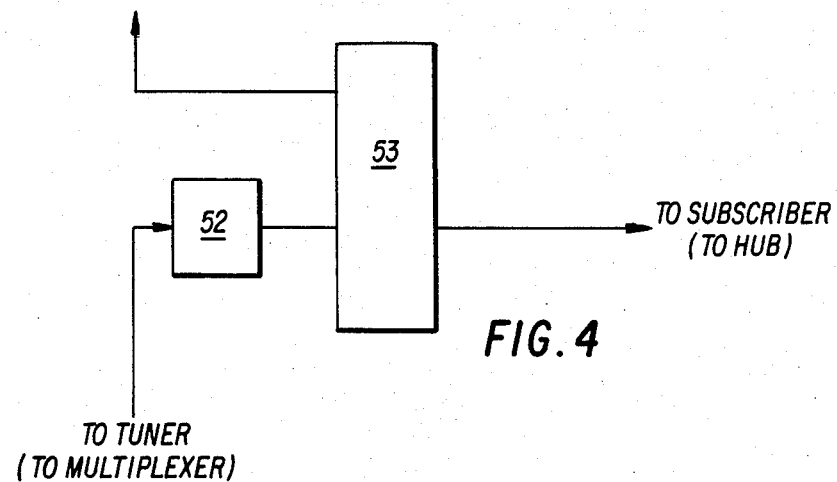
FIG. 4 shows the unit required at the hub and subscriber unit for receiving and transmitting optical signals of different wavelengths between a subscriber unit and a hub over a single, bidirectional optical fiber.
Figure 5:
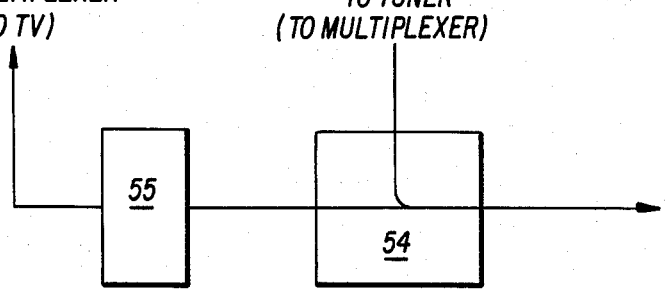
FIG. 5 shows the unit required at the hub and subscriber unit for receiving and transmitting optical signals of the same wavelength between a subscriber unit and a hub over a single, bidirectional optical fiber.

FIGS. 4 and 5 illustrate two suitable designs for the transmission means at the hub and subscriber unit, when a single, bidirectional optical fiber cable is used to connect the subscriber unit and hub. In FIG. 4, a unit designed for transmitting and receiving optical signals of different wavelengths, is pictured. The electrical signal transmitted from the tuner at the hub (or keypad at the subscriber unit) is directed to an optical transmitter 52 which generates the corresponding optical signal. The optical signal source may be any of the known laser and LED sources. An InGaAs diode is preferred.

Optical receiver 53 is made from a semiconductor material which possesses an energy band gap between the filled valence band and the higher empty conduction band which is greater than the quantum energy associated with the light signal produced by optical transmitter 52. This renders the receiver transparent to the optical signal produced by the transmitter. Thus, for example, when the receiver is a silicon-PIN photodiode, it receives light signals transmitted at 0.82 $\mu$m but is transparent to signals transmitted at 1.06 $\mu$m. Hence, by employing an optical transmitter at the hub which produces light signals having a greater wavelength than the signals transmitted by the subscriber, the hub signal can be transmitted directly into the optical fiber through the optical receiver without undue absorption. A bidirectional coupler is required in the subscriber unit to extract the optical signal transmitted from the hub. Of course, the arrangement can be reversed so that the bidirectional coupler is placed at the hub rather than in the subscriber unit.

The particular type of optical receiver employed will depend on the optical signal source. A silicon-PIN photodiode is most preferred in the system of the invention when InGaAs diodes are used as the optical signal sources. The optical signal received by the unit is collected by optical receiver 53, transformed into an electrical signal and directed to the appropriate subscriber control module at the hub or subscriber's TV set at the subscriber unit.

When optical signals of the same wavelength are transmitted by both the hub and the subscriber, two bidirectional couplers are required, one at the hub and one in the subscriber unit. As shown in FIG. 5, the coupler 54 taps the channel select signal transmitted up the fiber to the hub and the information signal transmitted to the subscriber and directs the signals to optical receiver 55 where they are transformed into electric signals and directed to the subscriber control module or the subscriber's TV set, at the hub and subscriber unit, respectively. The optical signal generated by the hub and subscriber unit are directed into the fiber in each unit by the coupler.

Since the signal transmitted from the subscriber to the hub is transmitted at a very low digital bit rate, it may be very weak and still perform adequately. Accordingly, the bidirectional coupler at the hub need tap only a small fraction of the signal being transmitted to the subscriber unit, while in the subscriber unit the coupler need provide only a relatively small tap in the fiber for introducing the channel select signal. Because of this, the video signal can be transmitted to the subscriber with minimal losses due to beam splitting, possibly less than 5% (i.e., −0.2 dB). This represents a small transmission penalty in view of the advantage of using standard light emitters having identical wavelengths for both upstream and downstream transmissions.

Of course, when separate optical fibers are used for upstream and downstream transmission in the fiber optic cable, it is not necessary to use bidirectional couplers or light emitters of different wavelengths in the system. In such systems, standard light emitters and receivers are simply placed at opposite ends of the fibers for transmitting and receiving the signals. As mentioned previously, the choice of single, bidirectional optical fiber cables or dual fiber cables is primarily a matter of economics in which the bidirectional fiber is preferred for transmitting over long distances.

Figure 6:
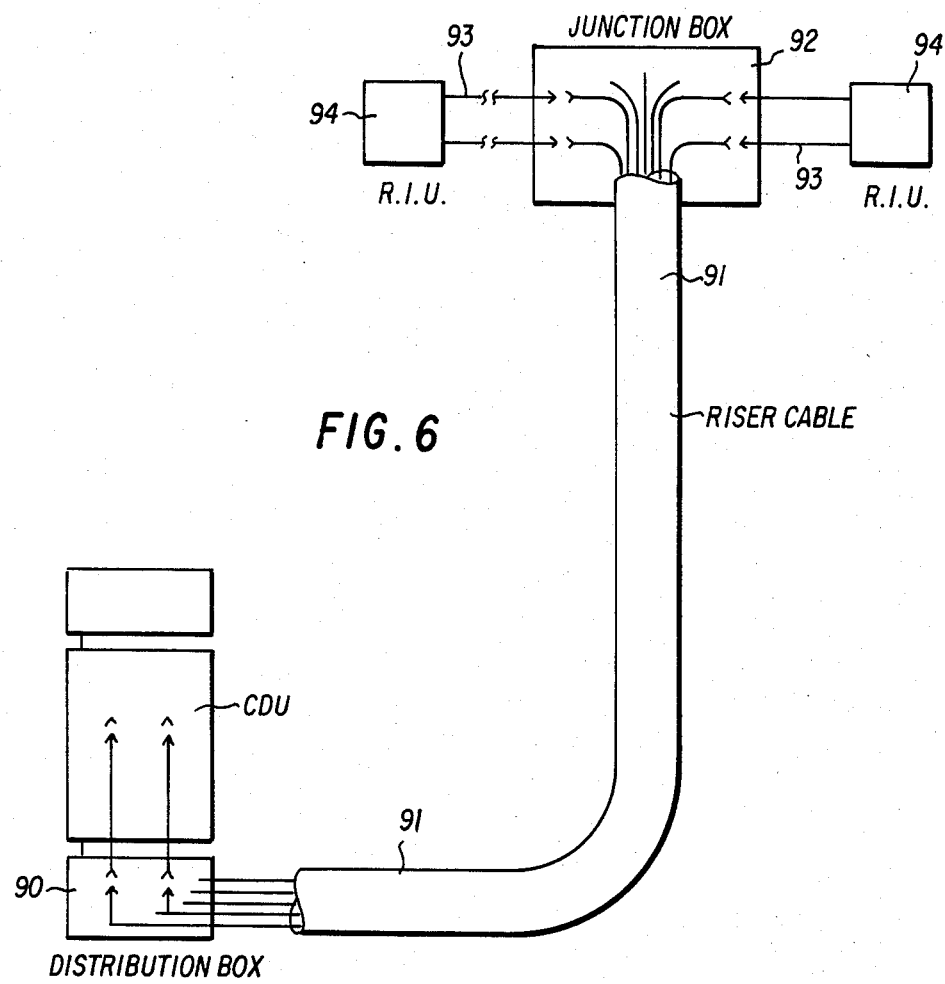
FIG. 6 shows a preferred fiber optic cable connection between a hub distribution center and a subscriber unit.

A further important factor in determining the configuration for the fiber optic network is the type of environment in which the system is to be installed. For example, in a high-rise dwelling typical of urban areas, a combination of multi-fiber vertical riser cables and individual home run cables are preferred. Such a configuration is shown in FIG. 6. Each converter module contained in a CDU at the hub terminates at optical connectors in distribution box 90. Vertical riser cable 91 originates at the distribution box and terminates at a junction box 92 on each floor. Home run cable 93 connects an individual subscriber's residential interface unit 94 with the junction box.

Figure 6A:
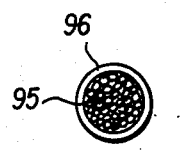
FIG. 6a is a cross-sectional view of the riser cable shown in FIG. 6.
Figure 6B:
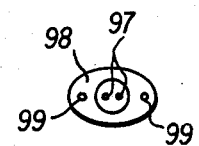
FIG. 6b is a cross-sectional view of the home run cable shown in FIG. 6.

FIGS. 6a and 6b show a cross-section of the vertical riser cable 91 and home run cable 93. The vertical riser cable may contain as many as twenty-four optical fibers 95 housed with a protective jacket 96. The home run cable contains two optical fibers 97 housed within a protective jacket 98. Reinforcing elements 99 may be embedded in the protective jacket for added strength.

It is also possible to employ a bidirectional coaxial cable to link the hub to an individual subscriber. In the past, distribution systems which have used conductive transmission paths have employed wire pairs. However, wire pairs limit transmission distance due to poor attenuation characteristics and require an equalizer at the subscriber station to compensate for the high attenuation of the wire pair of the higher frequency components of the transmitted signal. Coaxial cable is not subject to the same degree of attenuation and so is far preferable to wire pairs. Thus, the distribution system of the invention can be transformed into a non-optical system by replacing the fiber optic network with bidirectional coaxial cable. In this embodiment, both ends of the transmission line must be equipped with bidirectional couplers to permit two-way transmission between the hub and the subscriber.

As previously described, the optical signal transmitted from the hub is received at the subscriber unit by an optical receiver and converted into an electrical signal which is directed to the subscriber's TV set. Generally, a conductive link is required to connect the optical receiver to the TV. Because the conductive link may operate as an antenna if it is longer than approximately ½-meter in extremely noisy electro magnetic environments, it is preferred to place the optical receiver sufficiently close to the TV so that less than ½-meter of a conductive link is required to connect the receiver to the TV.

From the foregoing, it should be apparent that the information distribution system of the invention is extremely versatile. Not only does it provide a means for transmitting video signals to an individual subscriber which is independent of transmission to other subscribers, it is also adapted for providing numerous other services over a single fiber optic or bidirectional coaxial cable connection to the subscriber. Each subscriber is provided with the capability of directly interacting with the hub to select and pay for only the service desired. Moreover, the use of the hub distribution center greatly facilitates expansion of the system by allowing additional subscribers to be placed on line at minimal expense, since all that is required is a hook-up to the hub.

A further important characteristic of the system of the invention is its resistance to tampering. Unlike conventional CATV systems which attempt to prevent tampering by transmitting all available video channels in a scrambled form which can be unscrambled by an unscrupulous subscriber, the system of the invention transmits only one channel to the subscriber in response to a channel select signal and only after this signal has been approved by a control unit at the hub. Moreover, the relatively expensive components of the system, i.e., the CATV tuner are housed in a central location which facilitates protection and maintenance.

An additional advantageous feature of the system of the invention is the ease in which diagnostic programs can be added therein by virtue of the minicomputer contained in each central distribution unit at the hub. Because the operator can interface with each minicomputer at the hub, the operation of each component at the hub can be monitored. Most importantly, the converter module which transmits the requested service signals to the subscriber can be monitored to insure that a high quality signal is transmitted.

While the invention has now been described in terms of certain preferred embodiments, and exemplified with respect thereto, those of skill in the art will readily appreciate that various modifications, changes, omissions, and substitutions may be made without departing from the spirit of the invention. It is therefore intended that the present invention be limited solely by the scope of the following claims.

We claim:
1. An information distribution system comprising:
   (i) a hub distribution center,
   (ii) a plurality of individual subscriber units each connected to said hub distribution center by a fiber optic cable,
   (iii) means at said hub distribution center for receiving optical signals transmitted from each of said individual subscriber units to said hub distribution center through the fiber optic cables,
   (iv) means at said hub distribution center for receiving a plurality of information signals having different characteristic frequencies in frequency division multiplexed form, for selecting a single information signal from said plurality of information signals having different characteristic frequencies, for converting it to a transmission frequency which can be received directly by a television set and for transmitting it as an optical signal to an individual subscriber unit through the fiber optic cable in response to an optical signal transmitted from said individual subscriber unit to said hub distribution center through the same fiber optic cable,
   (v) means at each of said individual subscriber units for generating and transmitting an optical signal to said hub distribution center through the fiber optic cable, and
   (vi) means at each of said individual subscriber units for receiving the optical signal transmitted from said hub distribution center and for converting it to an electrical signal at said transmission frequency which can be received directly by a television set.

2. The system as defined by claim 1, wherein said information signals are video signals.

3. The system as defined by claims 1 or 2 wherein each of said subscriber units is connected to the hub distribution center by a fiber optic cable comprised of at least two optical fibers.

4. The system as defined by claims 1 or 2, wherein each of said subscriber units is connected to the hub distribution center by a fiber optic cable comprised of a single, bidirectional optical fiber.

5. The system as defined by claims 1 or 2, wherein each of said subscriber units is connected to the hub distribution center by a fiber optic cable comprised of at least one optical fiber and at least one metal wire pair.

6. The system as defined by claims 1 or 2, further comprising additional hub distribution centers, each of said centers being connected to a plurality of different subscriber units by fiber optic cable.

7. The system as defined by claims 1 or 2, wherein said hub distribution center contains means for determining that the subscriber is entitled to receive an information signal in response to the signal transmitted from said individual subscriber units.

8. The system as defined by claims 1 or 2, wherein said hub distribution center contains means for recording the economic accountability of each of said individual subscribers.

9. The system as defined by claims 1 or 2, wherein said means at each of said individual subscriber units for receiving the optical signal transmitted from said hub distribution center is positioned such that less than ½-meter of conductive material is required to link said receiving means to the subscriber's TV set.

10. The system as defined by claims 1 or 2, wherein said means at said hub distribution center for receiving optical signals transmitted from each of said individual subscriber units comprises a plurality of photodiodes positioned such that one photodiode receives the optical signals from one fiber optic cable connecting the hub distribution center to an individual subscriber unit.

11. The system as defined by claim 10, wherein said photodiodes are made from semiconductor material having an energy band gap which is greater than the quantum energy associated with the optical signal transmitted by the hub to an individual subscriber unit whereby the optical signal transmitted by the hub to an individual subscriber unit passes through the photodiode which received the optical signals transmitted from the subscriber and into the same fiber optic cable that connects the individual subscriber to the hub.

12. A cable TV broadcasting system comprising:
   (a) at least one subscriber unit comprising:
      (i) a push button panel operated by the subscriber which produces an electronic signal to request a single video channel from a plurality of available channels,
      (ii) a micro-processor, programmed to generate digital bit streams in response to the signal produced by said push button panel,
      (iii) means for combining the digital bit streams generated by the micro-processor into a single electronic information stream,
      (iv) an optical transmitter to transform said single electronic information stream into an optical signal and to transmit it through a fiber optic cable,
      (v) an optical receiver to receive an optical video signal and to convert it to an electronic video signal which can be viewed by a television, and
      (vi) a power supply; and
   (b) a hub distribution center containing for each subscriber unit, a distribution unit comprising:
      (i) an optical receiver to receive the optical signal transmitted from said subscriber unit and to transform it into an electronic signal,
      (ii) means for converting said electronic signal into serial data and clock digital bit streams,
      (iii) a decoder to identify the requested video channel from said serial data and clock digital bit streams and to select the requested video channel from a plurality of channels each having different characteristic frequencies,
      (iv) a tuner to receive said plurality of channels of different characteristic frequencies and to convert the requested channel from its characteristic frequency to a frequency which can be received directly by a television set,
      (v) an optical transmitter to transform said channel into an optical signal and to transmit it through a fiber optic cable to said subscriber unit, and
      (vi) a power supply.

13. The system as defined in claim 12, wherein said push button panel and said micro-processor are housed together in a key-pad and said combining means said optical transmitter and said optical receiver are housed together in a residential interface unit at said subscriber unit.

14. The system as defined by claims 1 or 12, wherein said fiber optic cable is comprised of optical fiber having a light transmitting core diameter greater than about 150 microns.

* * * * *